United States Patent
Garcia Azorero (10) Patent No.: US 9,955,340 B2
(45) Date of Patent: Apr. 24, 2018

(54) MACHINE-TYPE COMMUNICATION SUBSCRIPTION CONTROL

(71) Applicant: Telefonaktiebolaget LM Ericsson (publ), Stockholm (SE)

(72) Inventor: Fuencisla Garcia Azorero, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 244 days.

(21) Appl. No.: 14/555,879

(22) Filed: Nov. 28, 2014

(65) Prior Publication Data

US 2015/0087304 A1    Mar. 26, 2015
US 2016/0373921 A9    Dec. 22, 2016

Related U.S. Application Data

(62) Division of application No. 13/812,264, filed as application No. PCT/EP2011/059185 on Jun. 3, 2011, now Pat. No. 9,113,322.

(Continued)

(51) Int. Cl.
*H04W 4/00* (2018.01)
*H04W 8/22* (2009.01)
(Continued)

(52) U.S. Cl.
CPC ............ *H04W 8/22* (2013.01); *H04W 4/005* (2013.01); *H04W 8/18* (2013.01); *H04W 60/00* (2013.01); *H04L 69/24* (2013.01)

(58) Field of Classification Search
CPC . H04W 52/0251; H04W 72/04; H04W 28/02; H04W 4/40; H04W 4/005;
(Continued)

(56) References Cited

U.S. PATENT DOCUMENTS 8,438,278 B2 * 5/2013 Liao .................... H04L 41/0681
709/224
8,737,989 B2 * 5/2014 Luft ........................ H04W 4/00
370/338

(Continued)

OTHER PUBLICATIONS

International Search Report for PCT/EP201/059185 dated Sep. 16, 2011.

(Continued)

*Primary Examiner* — Hanh N Nguyen
(74) *Attorney, Agent, or Firm* — Baker Botts, LLP (57) ABSTRACT

An apparatus is configured to operate as a subscriber server. The apparatus comprises a memory for storing the subscription information of one or more Machine Type Communications, MTC, subscribers, the subscription information of a MTC subscriber including one or more MTC Features and information regarding the MTC subscriber's subscribed services, a processor for assessing which of the one or more subscribed MTC Features are supported, assessing any interaction that may occur between each of the supported subscribed MTC Features and between each of the supported subscribed MTC Features and the subscribed services, and determining the subscription information that should be sent to the serving node based on the outcome of the assessments, and a transmitter for sending the determined subscription information to the serving node.

12 Claims, 5 Drawing Sheets

Related U.S. Application Data (60) Provisional application No. 61/367,989, filed on Jul. 27, 2010.

(51) Int. Cl.
*H04W 8/18* (2009.01)
*H04W 60/00* (2009.01)
*H04L 29/06* (2006.01)

(58) Field of Classification Search
CPC ... H04W 8/22; H04W 8/18; H04W 4/00; H04L 41/0681; H04L 63/0823; G06F 15/173
USPC ............................... 709/224, 225; 455/432.3
See application file for complete search history.

(56) References Cited

U.S. PATENT DOCUMENTS

| | | | | |
|---|---|---|---|---|
| 8,868,743 | B2* | 10/2014 | Park | H04W 4/00 709/223 |
| 8,942,175 | B2* | 1/2015 | Kim | H04W 4/00 370/235 |
| 8,953,636 | B2* | 2/2015 | Taaghol | H04L 63/0823 370/252 |
| 9,113,322 | B2* | 8/2015 | Garcia Azorero | H04W 4/005 |
| 9,300,480 | B2* | 3/2016 | Kim | H04L 12/12 |
| 2011/0270984 | A1 | 11/2011 | Park | |
| 2011/0310731 | A1 | 12/2011 | Park et al. | |
| 2013/0051228 | A1 | 2/2013 | Kim et al. | |

OTHER PUBLICATIONS

CATT, "Consideration of MTC Features", 3GPP: R3-100309, $3^{rd}$ Generation Partnership Project (3GPP), Mobile Competence Centre, vol. RAN WG3, No. Valencia, Spain, Jan. 15, 2010, 5 pages.

ZTE, "Clarification on MTC Feature Activation", 3GPP Draft, S2-103129, $3^{rd}$ Generation Partnership Project (3GPP), Mobile Competence Centre, vol. SA WG2, No. Elbonia, Jun. 29, 2010, 3 pages.

$3^{rd}$ Generation Partnership Project; Technical Specification Group Services and System Aspects; System Improvements for Machine-Type Communications; (Release 10), 3GPP Standard; 3GPP TR.888, $3^{rd}$ Generation Partnership Project (3GPP), Mobile Competence Centre, vo. 5.1, Jul. 20, 2010, p. 1-75.

$3^{rd}$ Generation Partnership Project; Technical Specification Group Services and System Aspects; Service Requirements for Machine-Type Communication (MTC); Stage 1 (Release 10), 3GPP Standard; 3GPP TS 22.368, $3^{rd}$ Generation Partnership Project (3GPP), Mobile Competence Centre, vol. 10.1.0, Jun. 16, 2010, pp. 1-25.

\* cited by examiner

MACHINE-TYPE COMMUNICATION SUBSCRIPTION CONTROL

This application is a divisional of U.S. patent application Ser. No. 13/812,264, filed Jan. 25, 2013, which is the U.S. national phase of International Application No. PCT/EP2011/059185 filed Jun. 3, 2011 which designated the U.S. and claims priority to U.S. Provisional Application No. 61/367,989 filed Jul. 27, 2010, the entire contents of each of which are hereby incorporated by reference.

TECHNICAL FIELD

The present invention relates to a method and apparatus for implementing subscription control for a Machine-type communication (MTC) Device.

BACKGROUND

Figure 1:
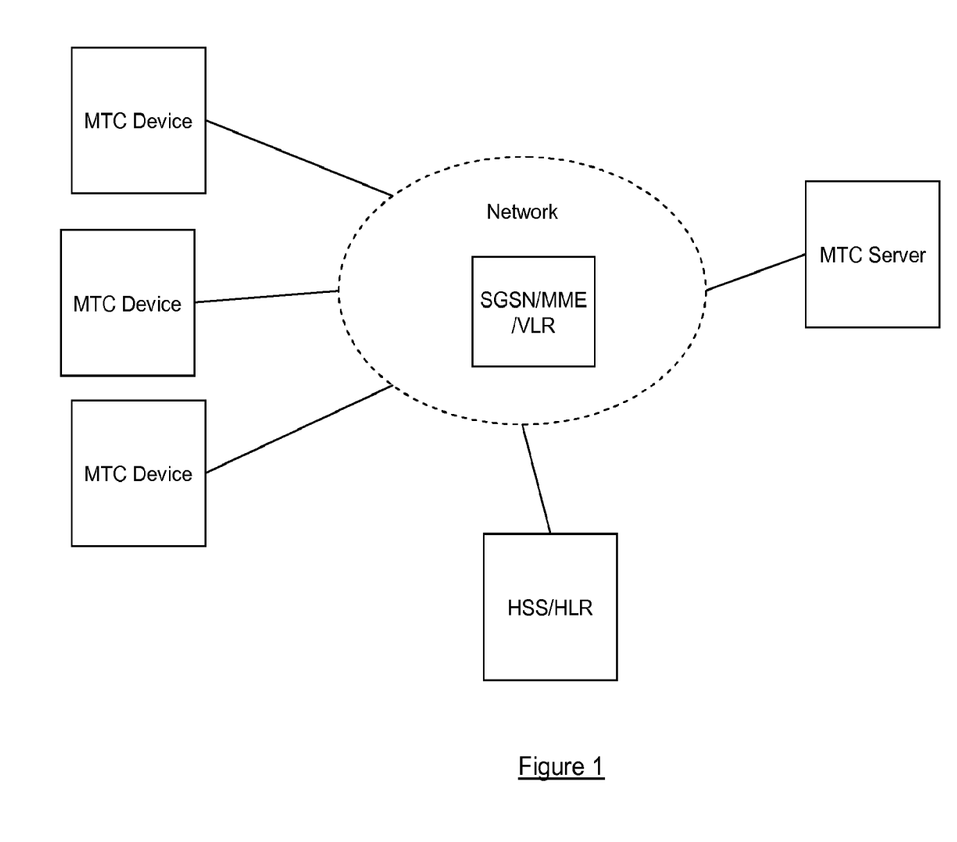
FIG. 1 illustrates schematically a communication scenario in which MTC Devices communicate with an MTC Server over a telecommunications network.

Machine-type communication (MTC), also known as Machine-to-Machine (M2M) communication, is a form of data communication which involves one or more entities that do not necessarily need human interaction. Such communication may be facilitated by the data services offered by existing mobile communication networks. However, a service optimised for machine-type communications differs from a service optimised for human-to-human communications. In particular, machine-type communications are different to current mobile network communication services as they involve different market scenarios, data communications, lower costs and effort, and a potentially very large number of communicating terminals with, to a large extent, little traffic per terminal. The entities involved in MTC are referred to as MTC Devices and MTC Servers. A MTC Device is a communication device equipped for MTC, which communicates through a PLMN with MTC Servers and/or other MTC Devices. FIG. 1 illustrates schematically a communication scenario in which MTC Devices communicate with an MTC Server over a telecommunications network.

The 3rd Generation Partnership Project (3GPP) is currently working to define a comprehensive set of network improvements for MTC. As part of this work some general requirements (e.g. in the areas of identification, addressing, congestion control etc) have already been defined. In addition, some network functions that are required in order to optimise networks for use by M2M applications have been identified, with these network optimisations being referred to as MTC Features. 3GPP TS 22.368 v10.1.0 defines these MTC Features as including Low Mobility, Time Controlled, Time Tolerant, Packet Switched (PS) Only, Small Data Transmissions, Mobile Originated Only, Infrequent Mobile Terminated, MTC Monitoring, Priority Alarm Messages, Secure Connection, Location Specific Trigger, Network Provided Destination for Uplink Data, Infrequent Transmission and Group Based MTC Features. It is expected that network operators will be able to independently offer MTC Features to a MTC Subscriber, with the MTC Features provided to a particular subscriber being identified in the subscription. As such, the MTC Devices that belong to a given MTC Subscriber will be controlled by the subscription and therefore subject to Subscription Control. However, it is not yet defined in any detail as to how Subscription Control of the MTC Features will be handled.

Currently, subscription data management for traditional mobile services is carried out according to the procedures defined for the S6a, S6d, Gr, and D interfaces (see 3GPP TS 29.272 and 3GPP TS 29.002). In general, these consist of the procedures defined to update entities within the core network that are responsible for mobility management with the subscriber data stored in the HLR/HSS, either at the time of attachment to the network, at restoration, or when a subscription change occurs due to administrative procedures. However, these existing solutions only cover the procedures for updating the information regarding the subscribers subscribed services, and do not include how to manage subscription information that includes subscribed MTC Features. As such, there is a need to define procedures for management of subscription information that includes subscribed MTC Features.

In this regard, 3GPP TR 23.888 V0.5.1 identifies some key issues for MTC that require system improvements, and outlines solutions to some of these key issues. In particular, section 6.37 proposes two alternative solutions, referred to as Simple Subscription Control, which could be included in 3GPP Specification Release 10. The first of these solutions proposes doing nothing, provided that no MTC Features are included in Release 10. The second of these solutions proposes identifying the subscribed MTC Features as Information Elements (IEs) in the MTC Subscription stored in the HSS, together with some procedures to determine whether or not the subscribed MTC Features are supported by the MTC Device and by the network. In addition, according to this solution, all subscribed MTC Features are considered essential and mandatory such that, if an MTC Device or the network does not support one or more of the subscribed MTC Features, then an attempt by an MTC Device to attach to the network is rejected. However, the information that would be needed within the new Information Elements identifying the MTC Features, and the message exchanges that would be needed between the HSS/HLR and the core network nodes to control service and MTC Feature availability, are not specified.

SUMMARY

It is an object of the present invention to provide mechanisms for managing subscription information for MTC Devices, this subscription information including the subscribed services and the subscribed MTC Features. In particular, it is an object of the present invention to provide mechanisms for providing a serving node with MTC subscriber data. In this regard, a serving node is a core network entity that provides subscribed services to subscribers that are attached to the node. For example, serving nodes can comprise any core network entities that provide mobility management, such as a Visitor Location Register (VLR) of a GSM core network, a Serving GPRS Support Node (SGSN) of a GPRS core network, or Mobility Management Entity (MME) of a SAE/LTE core network.

According to a first aspect of the present invention there is provided an apparatus configured to operate as a subscriber server. The apparatus comprises:

a memory for storing the subscription information of one or more Machine Type Communications, MTC, subscribers, the subscription information of a MTC subscriber including one or more MTC Features and information regarding the MTC subscriber's subscribed services;

a processor for assessing which of the one or more subscribed MTC Features are supported, assessing any interaction that may occur between each of the supported subscribed MTC Features and between each of the supported subscribed MTC Features and the subscribed services, and determining the subscription information that should be sent to the serving node based on the outcome of the assessments; and a transmitter for sending the determined subscription information to the serving node.

The processor may be further configured such that, when assessing which of the one or more subscribed MTC Features are supported, the processor determines if any of the subscribed MTC Features are not supported by the MTC Device and/or by a network in which the serving node is provided. The processor may then be configured such that, if any of the subscribed MTC Features are not supported by the MTC Device and/or by a network in which the serving node is provided, then the subscribed MTC Features that are not supported are excluded from the subscription information that is to be sent to the serving node.

The processor may be further configured such that, when determining if any of the subscribed MTC Features are not supported by the MTC Device or by a network, the processor determines if an indication that one or more MTC Features are not supported by the MTC Device and/or by the network has been received from the serving node, and, for any MTC Features that require an explicit indication that they are supported by the MTC Device and/or by the network, the processor determines if an indication that one or more MTC Features that are supported by the MTC Device and/or by the network has been received from the serving node.

The processor may be further configured such that, when assessing any interaction that may occur between each of the supported subscribed MTC Features, the processor determines if any of the supported subscribed MTC Features may interact or conflict with any other supported subscribed MTC Feature. The processor may then be configured such that, if any of the supported subscribed MTC Features may interact or conflict with any other supported subscribed MTC Feature, then an indication of the relative precedence of these MTC Features is included in the subscription information that is to be sent to the serving node.

The processor may be further configured such that, when assessing any interaction that may occur between each of the supported subscribed MTC Features and the subscribed services, the processor determines if any of the supported subscribed MTC Features imply restrictions on the subscribed services. The processor may then be configured such that, if any of the supported subscribed MTC Features imply restrictions on the subscribed services, then the subscribed services that are not allowed by the restrictions of the supported subscribed MTC Features are excluded from the subscription information that is to be sent to the serving node.

The processor may be further configured to determine if any of the supported subscribed MTC Features should only be enabled upon an explicit instruction received from the MTC Device. The processor may then be configured such that, if any of the supported subscribed MTC Features should only be enabled upon an explicit instruction received from the MTC Device, then an indication that these supported subscribed MTC Features should only be enabled upon an explicit instruction received from the MTC Device is included in the subscription information that is to be sent to the serving node.

The apparatus may be configured to send subscription information to the serving node when updating the MTC Device location information stored in the subscriber server, when restoring the subscription information of the MTC Subscriber stored in the subscriber server, and/or when the subscription information of the MTC Subscriber in the subscriber server is modified by the network operator.

The apparatus may be configured to operate as any one of a Home Subscriber Server and a Home Location Register. The apparatus may be configured to send subscription information to one or more of Mobility Management Entity, a Serving GPRS Support Node, and a Visitor Location Register.

According to a second aspect of the present invention there is provided an apparatus configured to operate as a node of a telecommunications network and configured to serve a Machine Type Communications, MTC, Device belonging to a MTC Subscriber. The apparatus comprises:

a processor for identifying MTC Features that are not supported by the MTC Device and/or the network; and a transmitter for indicating to a subscriber server the MTC Features that are not supported.

The processor may be further configured to ensure that, when indicating to a subscriber server the MTC Features that are not supported, for any MTC Features that require an explicit indication that they are supported by the MTC Device and/or by the network, an explicit indication is not included in a message to be sent to the subscriber server, and, for any other MTC Features, an indication that the MTC Feature is not supported is included in a message to be sent to the subscriber server.

The apparatus may further comprise a receiver for receiving subscription information for the MTC Subscriber from the subscriber server, the subscription information including the supported MTC Features and subscribed services information for the MTC Subscriber, and the processor being further configured to use the received subscription information to establish a data session for the MTC Device.

According to a third aspect of the present invention there is provided a method of operating a subscriber server handling subscription information of one or more Machine Type Communications, MTC, subscribers, the subscription information of a MTC subscriber including one or more MTC Features and information regarding the subscriber's subscribed services. The method comprises:

when it is required that subscription information for a MTC subscriber is sent to a network node serving an MTC device of the MTC subscriber;

assessing which of the one or more subscribed MTC Features are supported;

assessing any interaction that may occur between each of the supported subscribed MTC Features and between each of the supported subscribed MTC Features and the subscribed services;

determining the subscription information that should be sent to the serving node based on the outcome of the assessments; and sending the determined subscription information to the serving node.

The step of assessing which of the one or more subscribed MTC Features are supported may comprise determining if any of the subscribed MTC Features are not supported by the MTC Device and/or by a network in which the serving node is provided. The method may then further comprise, if any of the subscribed MTC Features are not supported by the MTC Device and/or by a network in which the serving node is provided, a step of excluding the subscribed MTC Features that are not supported from the subscription information that is to be sent to the serving node.

The step of determining if any of the subscribed MTC Features are not supported by the MTC Device or by a network in which the serving node is provided may comprise one or more of:

determining if an indication that one or more MTC Features are not supported by the MTC Device and/or by the network has been received from the serving node; and for any MTC Features that require an explicit indication that they are supported by the MTC Device and/or by the network, determining if an indication that one or more MTC Features that are supported by the MTC Device and/or by the network has been received from the serving node.

The step of assessing any interaction that may occur between each of the supported subscribed MTC Features may comprise determining if any of the supported subscribed MTC Features may interact or conflict with any other supported subscribed MTC Feature. The method may then further comprise, if any of the supported subscribed MTC Features may interact or conflict with any other supported subscribed MTC Feature, a step of including an indication of the relative precedence of these MTC Features in the subscription information that is to be sent to the serving node.

The step of assessing any interaction that may occur between each of the supported subscribed MTC Features and the subscribed services may comprise determining if any of the supported subscribed MTC Features imply restrictions on the subscribed services. The method may then further comprise, if any of the supported subscribed MTC Features imply restrictions on the subscribed services, a step of excluding the subscribed services that are not allowed by the restrictions of the supported subscribed MTC Features from the subscription information that is to be sent to the serving node.

The method may further comprise determining if any of the supported subscribed MTC Features should only be enabled upon an explicit instruction received from the MTC Device. The method may then further comprise, if any of the supported subscribed MTC Features should only be enabled upon an explicit instruction received from the MTC Device, a step of including an indication that these supported subscribed MTC Features should only be enabled upon an explicit instruction received from the MTC Device in the subscription information that is to be sent to the serving node.

It may be required that subscription information for a MTC subscriber is sent to a network node serving an MTC device of the MTC subscriber when updating the MTC Device location information stored in the subscriber server, when restoring the subscription information of the MTC Subscriber stored in the subscriber server, and/or when the subscription information of the MTC Subscriber in the subscriber server is modified by the network operator.

The subscriber server may be any one of a Home Subscriber Server, and a Home Location Register. The serving node may be any one of a Mobility Management Entity, a Serving GPRS Support Node, and a Visitor Location Register.

According to a fourth aspect of the present invention there is provided a method of operating a node of a telecommunications network that is configured to provided services to a Machine Type Communications, MTC, Device belonging to a MTC Subscriber. The method comprises:

identifying MTC Features that are not supported by the MTC Device and/or the network; and indicating to a subscriber server the MTC Features that are not supported.

The step of indicating to a subscriber server the MTC Features that are not supported may comprise:

for any MTC Features that require an explicit indication that they are supported by the MTC Device and/or by the network, not including an explicit indication in a message to the subscriber server; and for any other MTC Features, including an indication that the MTC Feature is not supported in a message to the subscriber server.

The method may further comprise subsequently receiving subscription information for the MTC Subscriber from the subscriber server, the subscription information including the supported MTC Features and subscribed services information for the MTC Subscriber, and using the received subscription information to establish a data session for the MTC Device.

DETAILED DESCRIPTION

There will now be described methods and apparatus for managing subscription information for MTC Devices, this subscription information including the subscribed services and the subscribed MTC Features. In particular, these methods and apparatus will provide mechanisms for providing a serving node within a visited/home network with MTC subscriber data, in which MTC Features are communicated between a subscriber server (e.g. HLR/HSS) and the serving node together with the subscribed service information. In this regard, a serving node is a core network entity that provides the subscribed services to subscribers that are attached to the node. For example, serving nodes can comprise any core network entities that provide mobility management, such as a Visitor Location Register (VLR) of a GSM core network, a Serving GPRS Support Node (SGSN) of a GPRS core network, or Mobility Management Entity (MME) of a SAE/LTE core network.

In addition, it has been recognised here that, as well as providing the serving nodes with information regarding the subscribed MTC Features, procedures for managing subscribed MTC Features should provide mechanisms for handling any interactions/associations between the MTC Features and traditional mobile services (which are identified in the conventional subscribed service information provisioned in the subscriber data) and that may therefore impact/influence the services that can be provided to the MTC Device, and mechanisms for handling interactions, overlap or conflicts between different MTC Features.

In order to handle interactions/associations between the MTC Features and traditional mobile services, and that may impact/influence the services that can be provided to the MTC Device, when determining the subscription information that should be downloaded to the serving nodes it should be considered how closely related the subscribed MTC Features are to the subscribed services. In this regard, the MTC Features referred to as Low Mobility, Time Controlled, Time Tolerant, Infrequent Mobile Terminated, MTC Monitoring, Priority Alarm Message, Secure Connection, Location Specific Trigger, Network Provided destination for Uplink Data, or Infrequent Transmission can be considered to be only loosely related or even independent of the traditional mobile services, as these MTC Features will be handled by the network independently of the service(s) selected for the communication between the MTC Device and the MTC Server. In this case, the MTC Features do not imply any restriction upon the set of services the MTC Device could make use of. The entire MTC Subscription information, consisting of MTC Feature data and subscribed service information should therefore be downloaded from the HLR/HSS to the serving node, unless these are restricted by network operator policies or capabilities.

The remaining MTC Features, including PS Only, Mobile Originated Only and Small Data Transmission, can be considered to be closely related with at least some of the traditional mobile services, given that the specification of these MTC Features makes reference to the services that are allowed for the MTC Device. For example, according to the current solution for Small Data Transmission, it is likely that no bearer other than SMS should be allowed for the MTC Device when the Small Data Transmission Feature is implemented. For this type of MTC Feature, it is proposed here that only the subscribed service information applicable to the subscribed MTC Features, together with the subscribed MTC Feature data, should be downloaded from the HLR/HSS to the serving node. In other words, if it is determined that any of the supported subscribed MTC Features imply restrictions on the subscribed services, then the subscribed services that are not allowed by the restrictions of the supported subscribed MTC Features are excluded from the subscription information that is to be sent to the serving node.

In order to handle interactions, overlap or conflicts between the different MTC Features, when determining the information that should be downloaded to the serving nodes, cases where the subscription information includes more than one subscribed MTC Feature should be considered. In this regard, the MTC Features Low Mobility, Infrequent Mobile Terminated, MTC Monitoring, Secure Connection, Location Specific Trigger, Network Provided destination for Uplink Data, and Infrequent Transmission do not interact with each other nor with any of the traditional mobile services. Therefore, these MTC Features can be implemented simultaneously without impacting upon one another, such that all of the subscribed services are available for the MTC Device, provided that both the network and the MTC Device support them and operator policies allow it.

The remaining MTC Features may interact with or interfere with each other. For example, the enforcement of the Time Tolerant feature might delay a communication attempt by an MTC Device long enough to produce a collision with the time period defined by the MTC Time Controlled feature for sending/receiving data. In addition, a Priority Alarm message should take precedence over any other feature. In order to avoid problems that could occur due to interaction or interference between the subscribed MTC Features, it is proposed here that the HSS/HLR provide indications to the serving node of the relative precedence of any potentially interacting or interfering MTC Features. For example, these indications can indicate whether Time Controlled takes precedence over Time Tolerant or the other way around. This precedence can be based on operator policies, and MTC Subscriber preferences. In other words, if it is determined that any of the supported subscribed MTC Features may interact or conflict with any other supported subscribed MTC Feature, then an indication of the relative precedence of these MTC Features is included in the subscription information that is to be sent to the serving node.

In addition, there are some MTC Features that are contradictory, and are therefore incompatible with one another. For example, the MTC Features Mobile Originated Only and Infrequent Mobile Terminated are contradictory, and are therefore completely incompatible. To prevent the possible simultaneous implementation of incompatible MTC Features, an attempt to subscribe to an MTC Feature that is not compatible with an existing subscribed MTC Feature should be rejected.

An additional case in which interactions, overlap or conflicts can occur between the different MTC Features, arises when two or more of the subscribed MTC Features are tightly related to the subscribed services (e.g. PS Only, Mobile Originated and Small Data Transmission). In this case, it is proposed here that the HLR/HSS should provide the serving node with MTC Feature data of the all the subscribed MTC Features, but should only provide restricted subscribed service information. This restricted subscribed service information would then only include those services that are allowed by the MTC Feature that places the greatest restrictions on the services that the MTC Device is allowed to use. Similarly, interactions, overlap or conflicts can occur between the different MTC Features when the subscribed MTC Features include at least one MTC Feature loosely related with a subscribed service (e.g. MTC Monitoring) and at least one other MTC Feature which imposes restrictions on the subscribed services (e.g., Small Data Transmission, or Mobile Originated, or Small Data Transmission). Once again, the MTC Feature that places the greatest restrictions on the services available to the MTC Device should always take precedence. The HLR/HSS then downloads to the serving node the MTC Feature data of all of the subscribed MTC Features, but only provides the subscribed service information for those services allowed by the MTC Feature that places the greatest restrictions on the services that the MTC Device is allowed to use.

Furthermore, the availability of an MTC Feature for an MTC Device will depend not only on the MTC Features provided for in the MTC Subscriber's subscription, but also on the capabilities of the MTC Device, the capabilities of the visited/home network, and the policies of the visited/home network operator. As such, these factors should also be considered when determining the information that should be downloaded to the serving nodes. In this regard, it is proposed here that, a serving node could notify the HLR/HSS of the MTC Features that it supports, such that the HLR/HSS will then only download information regarding MTC Features that the network has indicated are supported. In addition, or as an alternative, if one or more MTC Features cannot be enabled for an MTC Device (e.g. due to lack of support in the device, or because operator policies do not allow them), then the serving node could send an indication of this to the HLR/HSS. The HLR/HSS can then store information regarding the MTC Features that cannot be enabled for the MTC Device, and use this information to ensure that updates of MTC Subscriber data that are sent to the serving node relate only to the supported MTC Features. In other words, if it is determined that any of the subscribed MTC Features are not supported by the MTC Device and/or by the network, then the subscribed MTC Features that are not supported are excluded from the subscription information that is to be sent to the serving node.

Alternatively, the HLR/HSS could ignore the indications and send all of the MTC Subscriber data to the serving node. As a further alternative, if any of the subscribed MTC Features that are not supported are considered to be essential for the proper functioning of the MTC Device, then the HLR/HSS could reject the attempt to attach to the network. The MTC Device could then attempt to attach to another network.

It has also been recognised here that there might be cases in which a subscribed MTC Feature is available to an MTC Device (e.g. is supported and allowed by the network operator) but should only be enforced, or certain procedures related to the MTC Feature should only be performed by the network upon receipt of an explicit indication/instruction from the MTC Device. For example, this might be the case for an MTC Device that is required to implement the Time Tolerant MTC Feature, except for when specifics events occur, as these specific events are to be handled as Priority Alarm messages. In order to allow this type of behaviour in the network, it is proposed here that the MTC Feature data to be downloaded from the HLR/HSS to the serving node should include an indication that the enforcement of an MTC Feature depends on an explicit indication or instruction from the MTC Device.

The provision of MTC Subscriber information from the HSS/HLR to a serving node is performed when updating the location of the MTC Device, during restoration of MTC Subscriber data in either the serving node or HLR/HSS after a failure, and when the data in the HSS/HLR is modified by the network operator or service provider. This MTC Subscriber information will comprise Information Elements (IE) identifying the subscribed services and IEs identifying the subscribed MTC Features. In this regard, in order to implement the above methods of managing MTC Subscriber information, it is proposed here that the IEs identifying the subscribed MTC Features include various data related to the MTC Features. For example, an IE identifying a subscribed MTC Feature can include the following information:

- MTC Feature Identifier—containing an identifier of the MTC Feature;
- MTC Feature Data (Optional)—containing specific MTC Feature Data (e.g. 'stationary MTC Device' for MTC Feature Low Mobility);
- MTC Feature Precedence (Optional)—containing an indication of other MTC Features that this MTC Feature might interact, overlap or conflict with, and the relative precedence of the MTC Feature; and
- MTC Device Explicit Indication (Optional)—containing an indication as to whether any explicit indications or instructions are required from the MTC Device to request the network to enable this subscribed MTC Feature.

Figure 2:
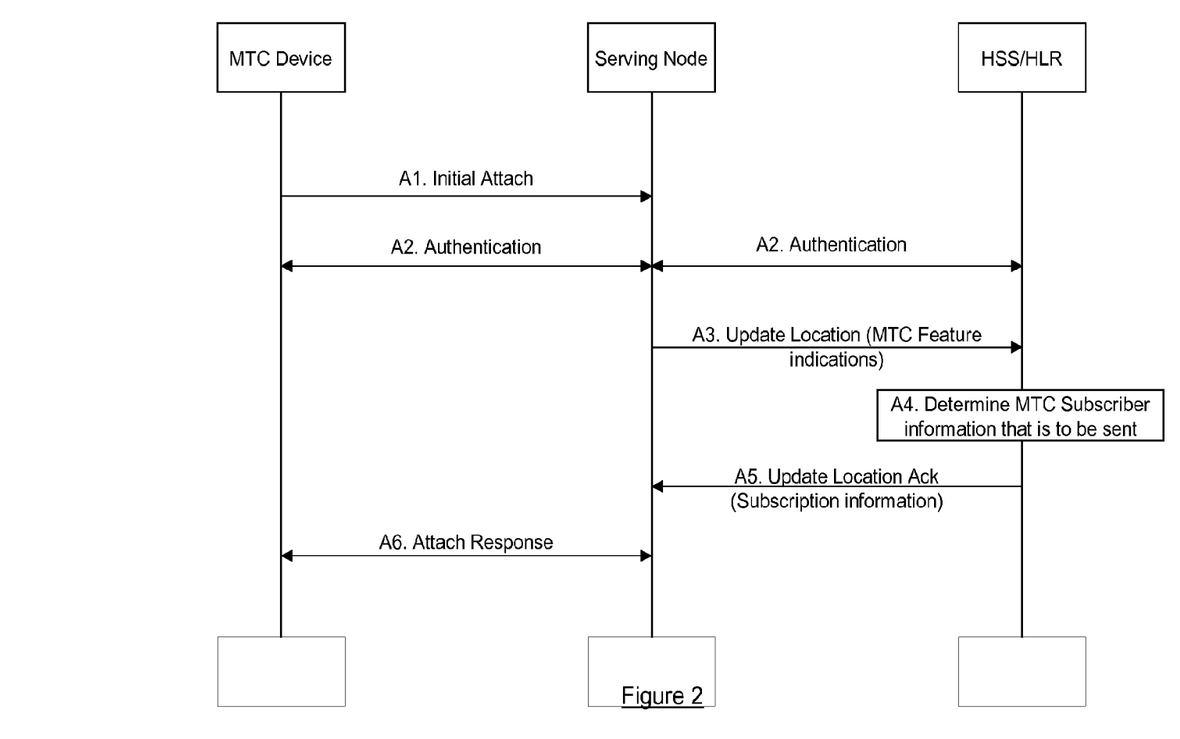
FIG. 2 is an example signalling flow diagram illustrating the process of an MTC Device updating its location.

During location updating procedures and during restoration of MTC Subscriber data in either the serving node or the HLR/HSS after a failure, MTC Subscription information, consisting of subscribed services information and the MTC Feature data of the subscribed MTC Features, is downloaded from the HLR/HSS to the serving node. FIG. 2 is a signalling flow diagram illustrating the process of an MTC Device updating its location at the HSS/HLR when MTC Subscriber information management is implemented in accordance with the methods detailed above. The steps performed are as follows:

A1. An MTC Device performs an Initial Attach procedure in order to register with and therefore access a network. This Initial Attach procedure is initiated by the MTC Device sending an Attach Request towards a serving node within the core network.

A2. The serving node then authenticates the MTC Device using the MTC Subscriber's authentication information that is stored in the HSS/HLR.

A3. Following network registration and authentication of the MTC Device, the serving node sends an Update Location Request message to the HSS/HLR. This message can include an indication of any MTC Features that are not supported (e.g. because they are not supported by the MTC Device or by the visited network, or because operator policies do not allow them) and/or an indication of any MTC Features that are supported (i.e. if an explicit indication of support is required).

A4. The HSS/HLR receives the Update Location Request message from the serving node, including any indications of supported/unsupported MTC Features, and determines the MTC Subscriber information that should be sent to the serving node based on the subscribed MTC Features. For example, the HSS/HLR can store information regarding the supported/unsupported MTC Features, and ensure that the MTC Subscriber information that is to be sent to the serving node relates only to the subscribed MTC Features that are supported. Alternatively, the HSS/HLR might ignore any indications included within the Update Location Request message, and might determine the MTC Subscriber information that should be sent to the serving node based solely on the subscribed MTC Features, without taking into account whether the MTC Features are explicitly supported/unsupported MTC Features.

A5. The HSS/HLR then sends the appropriate MTC Subscriber information to the serving node in an Update Location Ack/Answer message. Alternatively, the HSS/HLR can reject the Update Location Request, responding to the MME/SGSN with an Update Location Ack/Answer message indicating the cause of the rejection.

A6. If the Update Location Ack/Answer message received from the HSS/HLR indicates that the attach request was accepted, and therefore includes appropriate MTC Subscriber information, then the serving node sends an Attach Accept message to the MTC Device. If the Update Location Ack/Answer message received from the HSS/HLR indicates that the attach request was rejected, then the MME/SGSN sends an Attach Reject message to the MTC Device.

MTC Subscription information will also be sent from the HLR/HSS to the serving node during the restoration procedures performed after a failure at either the serving node or the HLR/HSS. In the case of recovery following a failure at the serving node, the serving node will request subscription information from the HLR/HSS by sending an Update Location Request message to the HSS/HLR in accordance with the procedure outlined above in relation to FIG. 2. In the case of recovery following a failure at the HLR/HSS, the HSS/HLR will send a Reset message to the serving node. As a result, the serving node will subsequently send an Update Location Request message to the HSS/HLR. The HSS/HLR will then provide the serving node with the appropriate MTC Subscription information in accordance with the procedure outlined above in relation to FIG. 2.

Figure 3:
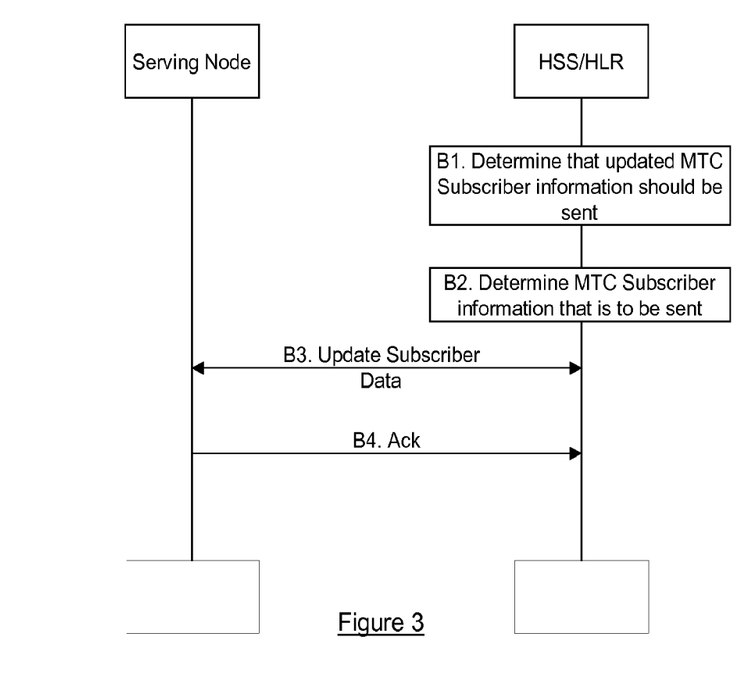
FIG. 3 is an exemplary signalling flow diagram illustrating the process of a HSS/HLR providing updated MTC Subscriber information to a serving node.

In addition, MTC Subscription information is sent from the HLR/HSS to the serving node when the data in the HSS/HLR is modified by the network operator or service provider. FIG. 3 is a signalling flow diagram illustrating the process of a HSS/HLR providing updated MTC Subscriber information to a serving node that provides services to a MTC Device associated with the MTC Subscriber, when MTC Subscriber information management is implemented in accordance with the methods detailed above. The steps performed are as follows:

- B1. The HSS/HLR determines that updated MTC Subscriber information should be sent to a serving node within the core network following a change in the MTS Subscriber data stored within the HSS/HLR.
- B2. The HSS/HLR then determines the MTC Subscriber information that should be sent to the serving node based on the subscriber's subscribed MTC Features. For example, the HSS/HLR will consider the availability of the subscribed MTC Features for the MTC Device, any interaction, overlap or conflict between the subscribed MTC Features, and any interaction or association between the active MTC Features and the subscribed services etc. For those MTC Features for which the serving node is required to indicate support of the MTC Feature, the HLR/HSS will have stored any indications previously received from the serving node in relation to the MTC Device, and will make use of the stored indications when determining the MTC Subscriber information that should be sent to the serving node.
- B3. The HSS/HLR will then send the appropriate MTC Subscriber information to the serving node in an Insert/Update Subscriber Data message.
- B4. The serving node updates the MTC Subscriber information for the MTC Device and acknowledges Insert/Update Subscriber Data message by returning an Acknowledge message to the HSS/HLR.

As detailed above, when determining the MTC Subscriber information that should be sent to the serving node, the HSS/HLR should consider:

- the availability of an MTC Feature for an MTC Device—which will depend on the MTC Features provided for in the MTC Subscriber's subscription, the capabilities of the MTC Device, the visited/home network capabilities, and the visited/home network operator policies;
- any interaction, overlap or conflict between the subscribed MTC Features—including whether or not any of the subscribed MTC Features impose restrictions on the subscribed services that will impact upon any of the other subscribed MTC Features;
- any interaction or relationship between the subscribed MTC Features and the subscribed services; and
- if any of the subscribed MTC Features should only be enforced by the network upon receipt of an explicit indication/instruction from the MTC Device.

Figure 4:
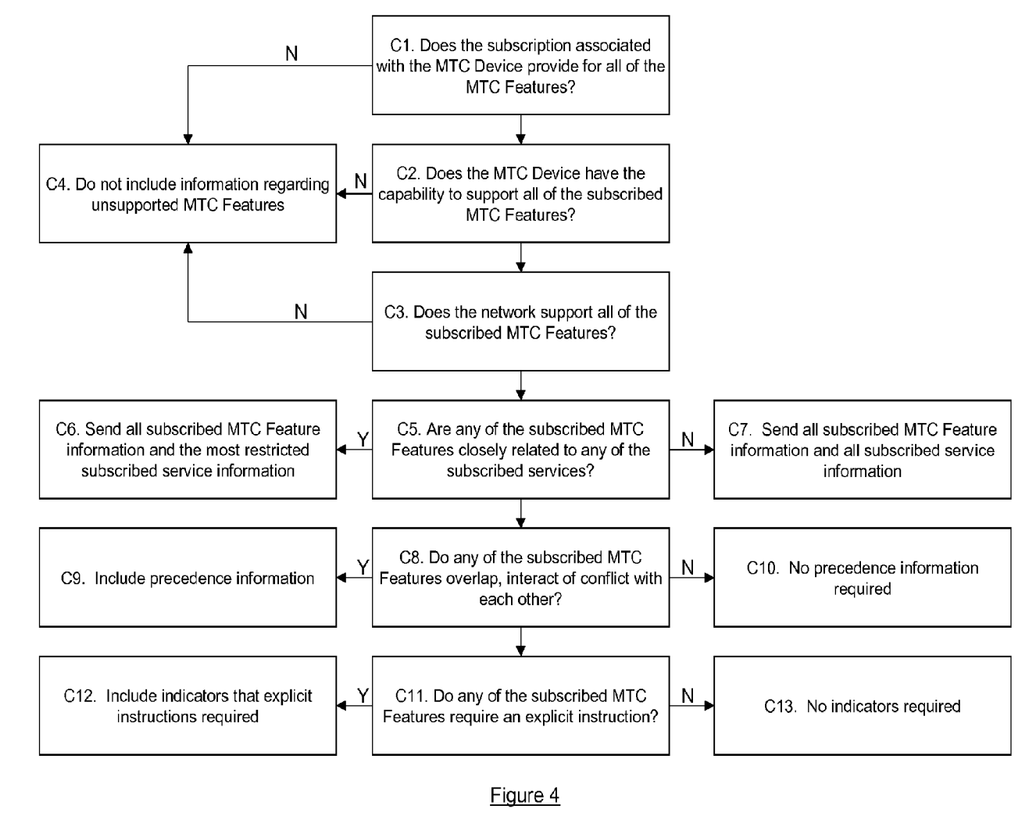
FIG. 4 is an exemplary flow diagram illustrating the process that may be performed by a HSS/HLR in order to determine the MTC Subscriber information that should be sent to a serving node.

FIG. 4 illustrates an exemplary flow diagram of the process that may be performed by a HSS/HLR in order to determine the MTC Subscriber information that should be sent to the serving node. Steps C1 to C13 illustrate the evaluations/assessments that are made by the HSS/HLR based on the MTC Features that are provided for in the subscription associated with the MTC Device, and how the result of each of these evaluations/assessments impacts on the subscription information that the HSS/HLR should send to the node serving the MTC Device.

Figure 5:
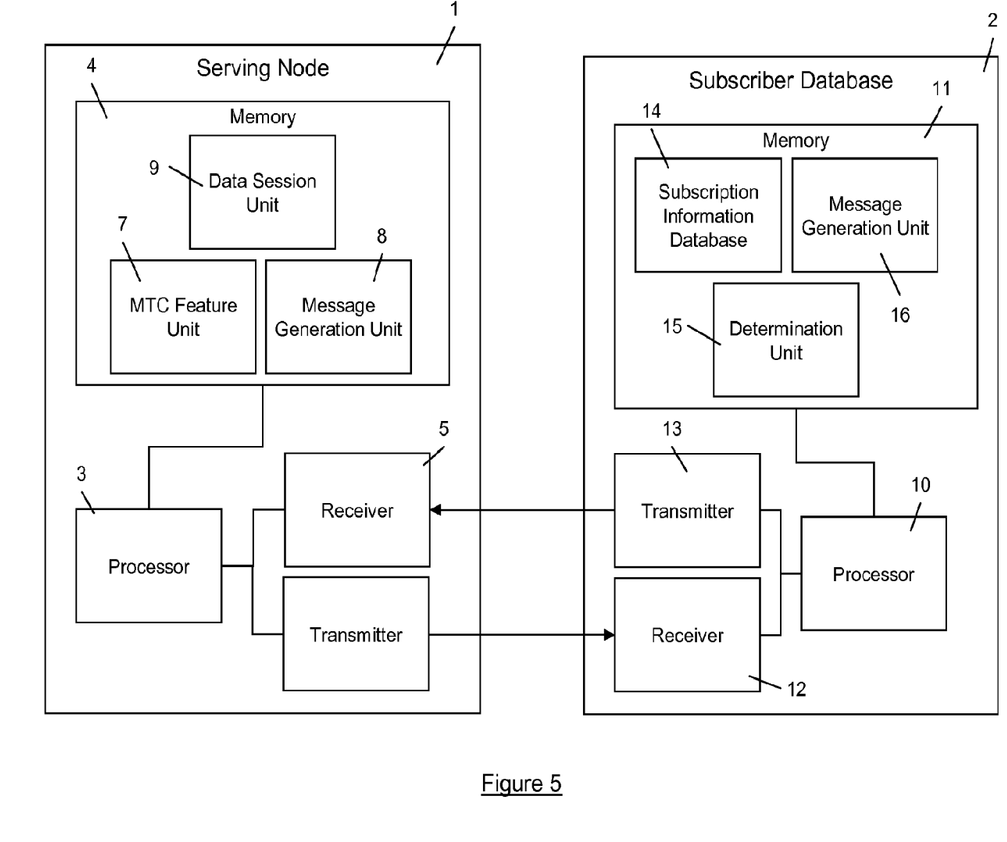
FIG. 5 illustrates schematically an example of a serving node and a subscriber server suitable for implementing MTC Subscriber information management.

FIG. 5 illustrates schematically an example of a serving node 1 and a subscriber server 2 suitable for implementing the methods of MTC Subscriber information management outlined above. The serving node 1 and the subscriber server 2 can each be implemented as a combination of computer hardware and software.

The serving node 1 comprises a processor 3, a memory 4, a receiver 5 and a transmitter 6. The memory 4 stores the various programs/executable files that are implemented by the processor 3, and also provides a storage unit for any required data. The programs/executable files stored in the memory 4, and implemented by the processor 3, include a MTC Feature Unit 7, a Message Generation Unit 8, and a Data Session Unit 9. The serving node 1 could be any of a Mobility Management Entity (MME), a Serving GPRS Support Node (SGSN), and a Visitor Location Register (VLR).

The subscriber server 2 comprises a processor 10, a memory 11, a receiver 12 and a transmitter 13. The memory 11 stores the various programs/executable files that are implemented by the processor 10, and also provides a storage unit for any required data, such as a Subscriber Information Database 14. The programs/executable files stored in the memory 11, and implemented by the processor 10, include a Determination Unit 15 and a Message Generation Unit 16. The subscriber server could be any one of a Home Subscriber Server (HSS) and a Home Location Register (HLR).

The methods and apparatus described above provide that the relationship between MTC Features and the traditional mobile services can be assessed/evaluated when determining the MTC Subscriber information that is provided to a node serving an MTC Device. These methods and apparatus also provide that the HSS/HLR can indicate the relative precedence of the subscribed MTC Features when providing MTC Subscriber information to the serving node, thereby avoiding possible conflicts between MTC Features. In addition, these methods and apparatus ensure that, if the subscribed MTC Features restrict the subscribed services that can be provided to the MTC Device, then the MTC Subscriber information sent to a serving node only includes information relating to the restricted subscribed services that can be provided to the MTC Device. In doing so, these methods and apparatus avoid the sending of inappropriate information to the serving nodes.

It will be appreciated by the person of skill in the art that various modifications may be made to the above-described embodiments without departing from the scope of the present invention. For example, whilst the embodiments described above provide examples of particular MTC Features that may interact with other MTC Features and/or particular mobile services, there are other MTC Features and other mobile services that may also interact with each other, and that should therefore be considered when managing the subscription information associated with an MTC Device.

The invention claimed is:

1. An apparatus configured to operate as a network node of a telecommunications network, the apparatus comprising:
   a processor configured to:
   identify unsupported Machine Type Communications (MTC) Features, wherein an unsupported MTC Feature is an MTC Feature that at least one of an MTC Device belonging to an MTC Subscriber and the network node is not enabled to implement or execute; and
   implement or execute an MTC Feature for the MTC Device; and a transmitter configured to send to a Home Location Register (HLR) separate from the network node indications of the unsupported MTC Features that the at least one of the MTC Device and the network node is not enabled to implement or execute, wherein the processor is further configured to:

for an unsupported MTC Feature that requires an indication of being supported by the MTC Device and the network node, exclude such indication of the unsupported MTC Feature from a message to be sent to the Home Location Register; and for an unsupported MTC Feature that does not require an indication of being supported by the MTC Device and the network node, include an indication of the MTC Feature that does not require an indication of being supported by the MTC Device and the network node in a message to be sent to the Home Location Register.

2. The apparatus as claimed in claim 1, and further comprising:

a receiver configured to receive subscription information for the MTC Subscriber from the Home Location Register, the subscription information including supported MTC Features and subscribed services information for the MTC Subscriber; and the processor being further configured to use the received subscription information to establish a data session for the MTC Device.

3. A method of operating a subscriber server handling subscription information of one or more Machine Type Communications (MTC) subscribers, the subscription information of an MTC subscriber including one or more MTC Features and information regarding the subscriber's subscribed services, the method comprising:

when it is required that subscription information for an MTC subscriber be sent to a network node configured to implement or execute an MTC Feature for an MTC device of the MTC subscriber:

determining, by the subscriber server, amongst one or more subscribed MTC Features, supported MTC Features that the MTC Device and the network node are enabled to implement or execute and unsupported MTC Features that at least one of the MTC Device and the network node is not enabled to implement or execute;

determining, by the subscriber server, interactions between the supported MTC Features and the subscribed services;

determining, by the subscriber server, the subscription information that should be sent to the network node based on the supported MTC Features and the determined interactions; and sending, by the subscriber server, the determined subscription information to the network node.

4. The method as claimed in claim 3, wherein determining the supported and unsupported MTC Features comprises:

determining, for each of the one or more subscribed MTC Features, whether both the MTC Device and the network node are enabled to implement or execute the subscribed MTC Feature.

5. The method as claimed in claim 4, wherein the unsupported MTC Features are excluded from the subscription information that is to be sent to the network node.

6. The method as claimed in claim 4, wherein determining the unsupported MTC Features comprises one or more of:

determining whether an indication has been received from the network node indicating one or more MTC Features that at least one of the MTC Device and the network node is not enabled to implement or execute; and for any MTC Feature that requires an indication of being supported by the MTC Device and the network node, determining whether an indication has been received from the network node indicating one or more MTC Features that the MTC Device and the network node are enabled to implement or execute.

7. The method as claimed in claim 3, wherein determining the interactions between the supported MTC Features and the subscribed services comprises:

determining any of the supported MTC Features that interact or conflict with any other supported MTC Feature.

8. The method as claimed in claim 7, wherein, in response to the determination that any of the supported MTC Features interact or conflict with any other supported MTC Feature, including a relative precedence of these supported MTC Features in the subscription information that is to be sent to the network node.

9. The method as claimed in claim 3, wherein determining interactions between the supported MTC Features and the subscribed services comprises:

determining any of the supported MTC Features that imply restrictions on the subscribed services.

10. The method as claimed in claim 9, wherein, in response to the determination that any of the supported MTC Features imply restrictions on the subscribed services, excluding the subscribed services that are not allowed by the restrictions of the supported MTC Features from the subscription information that is to be sent to the network node.

11. The method as claimed in claim 3, and further comprising:

determining any of the supported MTC Features to be enabled only upon an instruction received from the MTC Device.

12. The method as claimed in claim 11, wherein, in response to the determination that any of the supported MTC Features to be enabled only upon an instruction received from the MTC Device, including an indication that these supported MTC Features are to be enabled only upon an instruction received from the MTC Device, in the subscription information that is to be sent to the network node.

* * * * *